United States Patent [19]

Wargo

[11] Patent Number: 4,682,213

[45] Date of Patent: Jul. 21, 1987

[54] MAGNITUDE INDEPENDENT HANGING DOT DETECTOR

[75] Inventor: Robert A. Wargo, Ringoes, N.J.

[73] Assignee: RCA Corporation, Princeton, N.J.

[21] Appl. No.: 791,145

[22] Filed: Oct. 24, 1985

[51] Int. Cl.[4] .............................................. H04N 9/64
[52] U.S. Cl. ......................................... 358/31; 358/39
[58] Field of Search ....................... 358/31, 36, 37, 38, 358/39

[56] References Cited

U.S. PATENT DOCUMENTS

| | | | |
|---|---|---|---|
| 4,149,181 | 4/1979 | Burdick et al. | 358/31 |
| 4,179,705 | 12/1979 | Faroudja | 358/31 |
| 4,241,363 | 12/1980 | Maeyama et al. | 358/36 |
| 4,415,918 | 11/1983 | Lewis, Jr. | 358/23 |
| 4,523,221 | 6/1985 | Chin et al. | 358/21 |
| 4,544,944 | 10/1985 | Chin | 358/28 |

OTHER PUBLICATIONS

Research Disclosure, by William K. Hickok, #17356, pp. 56–57, Sep. 78.
"Vectors", by Barnett and Fujii, John Wiley & Sons, Inc., New York, 1963, pp. 5 and 33.

Primary Examiner—Tommy P. Chin
Assistant Examiner—David E. Harvey
Attorney, Agent, or Firm—Paul J. Rasmussen; Eric P. Herrmann; David N. Caracappa

[57] ABSTRACT

A hanging dot detector for a video signal processor including a comb filter is disclosed. The respective phases of the signals in the band of frequencies normally containing color representative information of both the comb filtered chrominance and luminance signals are detected. The magnitude of the changes of the respective comb filtered luminance and chrominance phase angle signals over a given time period are compared. A control signal is generated in response to the comparison of the changes over the period of time of the respective phases. A signal coupling unit couples the comb filtered luminance signal to the luminance processing channel. In response to the control signal, the signal coupling means alters the frequency composition of the comb filtered luminance signal so as to eliminate the color representative information. A further embodiment is disclosed to process a complementary-color vertical transition condition.

13 Claims, 8 Drawing Figures

MAGNITUDE INDEPENDENT HANGING DOT DETECTOR

The present application relates to a hanging dot detector in a video signal processor which uses a comb filter to separate luminance and chrominance components from a composite video signal.

Under certain signal conditions the separation achieved by a comb filter is imperfect. Under these conditions, some color representative information appears in the comb filtered luminance signal; and some brightness representative information appears in the comb filtered chrominance signal (in addition to the vertical detail luminance information which appears there normally). The former phenomenon results in the display of a series of dots (known as hanging dots) at the frequency of the color subcarrier.

A one line delay comb filter achieves perfect separation when there is no change vertically between adjacent display lines. If there is a color change in the reproduced image between adjacent display lines, some color representative information is included in the comb filtered luminance signal. The extreme case occurs when on one line, the color representative information modulates the color subcarrier in such a manner that it has a given amplitude and phase and on the next line it has the same amplitude and phase, taking into account the normal 180° phase shift from line-to-line. In this case, all of the color representative information appears in the comb filtered luminance signal, and the comb filtered chrominance signal is zero. This condition is known as a complementary-color vertical transition.

Prior art hanging dot detectors have detected the presence of color representative information in the comb filtered luminance signal by calculating the cross-correlation between the comb filtered luminance and chrominance signals. U.S. Pat. No. 4,241,363 issued Dec. 23, 1980 to Maeyama et al. is an example of such a hanging dot detector.

In these prior art hanging dot detectors, if a hanging dot condition is detected, the frequency composition of the comb filtered luminance signal coupled to the luminance processing channel is altered to eliminate the color representative information. The usual alteration is to provide a low pass filtered comb filtered luminance signal to the luminance processing channel during a hanging dot condition. Because the color representative information normally occupies the high frequency portion of the comb filtered luminance signal, this eliminates the color representative information. When no hanging dot condition is detected, then a full bandwidth luminance signal is coupled to the luminance processing channel.

These prior art cross-correlation hanging dot detectors, however, are sensitive to the magnitude of the color representative information in the comb filtered chrominance and luminance signals. That is, the output of such a detector varies with varying amplitudes of the color representative information in the respective comb filtered signals. It is desirable to have a hanging dot detector which is not magnitude dependent.

In accordance with the principles of the present invention, it was determined that, if the phases of the signals in the frequency band normally occupied by color representative information in the comb filtered luminance and chrominance signals respectively change by the same amount over a given period of time, (i.e. the phases track each other) this is an indication of a hanging dot condition. Under such a condition, steps are taken to eliminate the color representative information from the comb filtered luminance signal.

If either comb filtered signal has a low amplitude, then the phase detection for that signal becomes less accurate and the control signal may be generated erroneously. Also, if the amplitudes are low, the hanging dots displayed are at so low a level as to be unobjectionable. In accordance with another aspect of the invention, the control signal is only generated if the amplitude of the signal in the frequency band normally occupied by color representative information is substantially non-zero in both the comb filtered luminance and chrominance signals.

In the complementary-color vertical transition condition, the amplitude of the comb filtered chrominance will be zero and all the color representative information will appear in the comb filtered luminance signal. Yet the hanging dots will be at the worst case, despite the zero amplitude of the comb filtered chrominance signal. In accordance with yet another aspect of the present invention, a complementary-color vertical transition is detected, and a proper control signal is generated. If the amplitude of the signal in the frequency band normally occupied by color representative information in the composite video signal is substantially non-zero, but the detected amplitude of the signal in the corresponding frequency band of the comb filtered chrominance signal is substantially zero, this indicates a complementary-color vertical transition. In this case, the control signal is generated despite the zero amplitude of the comb filtered chrominance signal.

The comb filtered luminance and chrominance phase angle signals track within a horizontal line so long as the color representative information changes relatively slowly. During a relatively fast transition, however, the tracking breaks down. The speed of transition which produces an anamaly is related to the bandwidth of the color representative information. In accordance with yet another aspect of the present invention, when a hanging dot condition is detected, a control signal is generated which is extended in time sufficiently to be present during the transition periods before and after the detected condition.

Apparatus according to the present invention is embodied in a video signal processor including a comb filter, a luminance processing channel, and a signal coupling unit for coupling the comb filtered luminance signal to the luminance processing channel. The frequency composition of the comb filtered luminance signal coupled to the luminance processing channel is altered in response to a control signal which indicates a hanging dot condition. A magnitude independent hanging dot detector comprises a phase detector coupled to the comb filter. The phase detector produces at two outputs the detected phases of the signals in the frequency band normally occupied by color representative information in the comb filtered luminance and chrominance signals, respectively. A phase comparing means compares the changes over a given time period of the respective detected phase from the phase detector. A control signal generator generates the control signal in response to this comparison.

Figure 1:
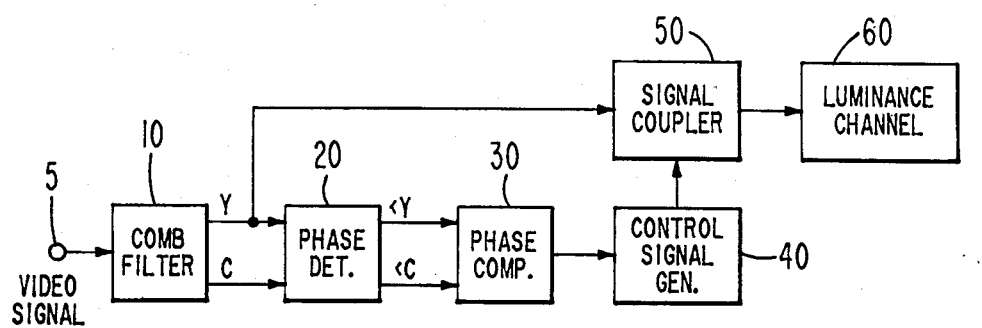
FIG. 1 is a block diagram of a video signal processor embodying a hanging dot detector according to the present invention.

FIG. 1 illustrates a video signal processor embodying a magnitude independent hanging dot detector in accordance with the present invention. A composite video signal source (not shown), such as the front end of a standard color television receiver, supplies a composite video signal to terminal 5. Terminal 5 is coupled to an interline comb filter 10. The comb filter 10 produces comb filtered luminance, Y, and chrominance, C, signals. The comb filtered luminance and chrominance signals are coupled to a phase detector 20. Phase detector 20 produces respective signals ∠Y and ∠C representing the phases of the signals in the band of frequencies normally occupied by the color representative information in the comb filtered luminance and chrominance signals. The respective phases ∠Y and ∠C are coupled to a phase comparator 30. Phase comparator 30 produces a signal representing a comparison of the changes over a given time period of the comb filtered luminance phase ∠Y and chrominance phase ∠C.

The signal from phase comparator 30 is coupled to control signal generator 40. The control signal generator produces a control signal responsive to the comparison. This control signal is coupled to a control input of a signal coupling unit 50. Signal coupling unit 50 has a signal input which is coupled to comb filter 10 to receive the comb filtered luminance signal Y. The signal output of signal coupling circuit 50 is coupled to luminance processing channel 60.

Signal coupling unit 50 includes an adjustable filter which alters the frequency composition of the comb filtered luminance signal Y in response to the control signal. An example of such a signal coupling unit is described in U.S. Pat. No. 4,149,181 entitled "Signal-Dependent Chrominance Subcarrier Filtering Circuit" issued Apr. 10, 1979 to Burdick et al. In this U.S. Patent, the comb-filtered luminance signal is provided to two subchannels. A band-reject filter is in one subchannel and only a matching delay in the other. The band-reject filter provides a greater amount of attenuation to the chrominance frequencies than to those below them. In the presence of a detected hanging dot condition, the band-reject filtered comb filtered luminance signal is coupled to the luminance processing channel. Otherwise, the unfiltered comb filtered luminance signal, from the other subchannel, is coupled to the luminance processing channel.

Control signal generator 40 will generate the control signal in response to the comparison of the phase changes over the given time period. If the phases are tracking, then a comparison of the changes over the given time period will indicate substantial equality, otherwise inequality will be indicated. If the phase changes are equal, the control signal is sent to the signal coupling circuit 50. Signal coupling circuit 50 then eliminates the color representative information from the comb filtered luminance signal.

Figure 2:
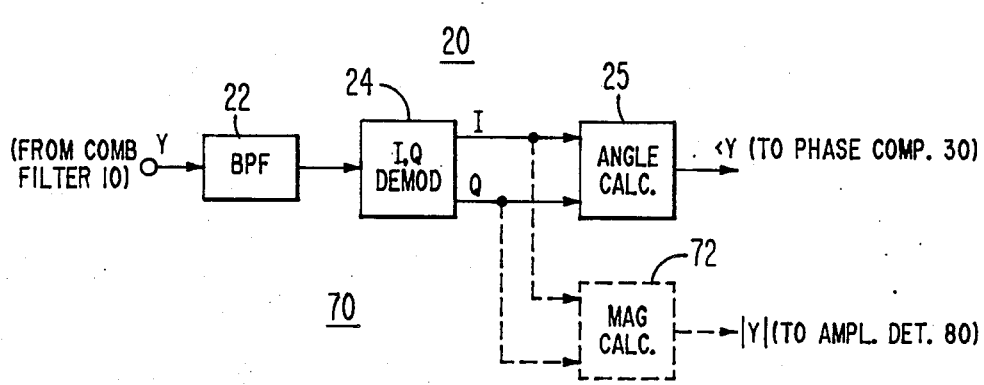
FIG. 2 is a block diagram of a portion of a phase and amplitude detector which may be used in the hanging dot detectors illustrated in FIGS. 1, 5 and 7.

FIG. 2 illustrates a portion of a phase detector 20 which may be used in the video signal processor illustrated in FIG. 1. The portion illustrated processes the comb filtered luminance signal Y and produces a signal ∠Y representing the phase of that signal. A similar portion processes the comb filtered chrominance signal and produces a signal representing the phase of that signal. These two circuits together make up the phase comparator 20 of FIG. 1.

In FIG. 2, the comb filtered luminance signal from comb filter 10 of FIG. 1 is coupled to a bandpass filter 22. The bandpass filter 22 passes the band of frequencies which contain color representative information in the presence of a vertical transition. The output of the bandpass filter 22 is supplied to a color signal demodulator 24. Color signal demodulator 24 produces a pair of base color signals which in combination form basis vectors from which the phase angle of the color representative information may be derived. The color signal demodulator 24 in the illustrated embodiment operates on samples taken at four times the subcarrier frequency and produces a pair of orthogonal color difference signals, I and Q. (In another embodiment, (R-Y) and (B-Y) or any other pair of orthogonal color difference signals may be generated, or samples taken at three times the subcarrier frequency may generate the base signals.)

The I and Q signals are supplied to phase angle calculator 25. Phase angle calculator 25 calculates the phase angle of the resultant of the orthogonal color difference signals with respect to some given axis. In the NTSC system, the given axis is sometimes taken as the -(B-Y) axis, which is supplied by the burst component of the composite video signal. The output ∠Y of phase angle calculator 25 is supplied to phase comparator 30 of FIG. 1. (The components of FIG. 2 illustrated in phantom will be described below.)

An exemplary I, Q orthogonal color difference signal demodulator which may be used as the demodulator 24 of FIG. 2 is described in U.S. Pat. No. 4,415,918 entitled "Digital Color Television Signal Demodulator" issued Nov. 15, 1983 to Henry G. Lewis, Jr. An exemplary phase angle calculator which may be used as the phase angle calculator 25 of FIG. 2 is described in U.S. Pat. No. 4,523,221 entitled "TV Receiver Circuitry for Performing Chroma Gain, Auto-Flesh Control and the Matrixing of I and Q Signals to (R-Y), (B-Y) and (G-Y) Signals" issued June 11, 1985 to Danny Chin et al.

Figure 3:
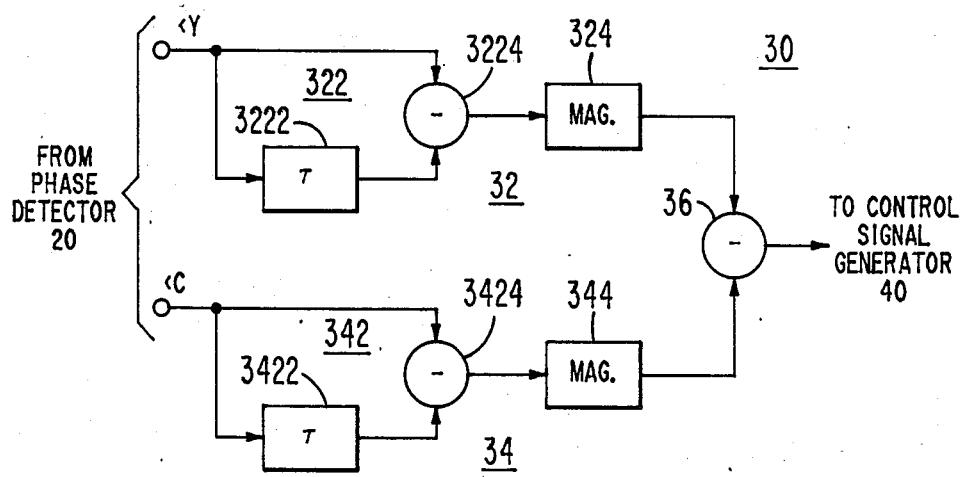
FIG. 3 is a block diagram of a phase comparator which may be used in the hanging dot detectors illustrated in FIGS. 1, 5 and 7.

FIG. 3 illustrates a phase comparator 30 which may be used in the video signal processor of FIG. 1. The comb filtered luminance ∠Y and chrominance ∠C phase angle signals from phase detector 20 are supplied to circuits 32 and 34 respectively which calculate the magnitude of the changes in phase of the respective signals over a given time period. The comb filtered luminance phase angle signal ∠Y is coupled to a delay circuit 3222 and one input of a subtractor 3224. The output of delay circuit 3222 is coupled to another input of subtractor 3224. Delay circuit 3222 and subtractor 3224 in combination form a circuit 322 for calculating the difference in phase of the comb filtered luminance phase angle signal at times separated by the time period of the delay introduced by delay circuit 3222. An exemplary time period could be the period of the color subcarrier, which has a frequency of 3.58 MHz in an NTSC system. The output of subtractor 3224 is supplied to a magnitude generator 324. Magnitude generator 324 calculates the magnitude of the change in the phase angle over the given period of time.

In a similar manner, the comb filtered chrominance phase angle signal $\angle C$ is processed by circuitry 342 which calculates the difference in phase of the input signal at times differing by the given time period. The phase comparator 342 comprises delay circuit 3422 and subtractor 3424. Magnitude generator 344 receives the change in phase angle from phase comparator 342 and generates the magnitude of the change of phase over the given time period.

The output of circuitry 32 (from magnitude generator 324) is coupled to one input of a subtractor 36. The output of circuitry 34 (from magnitude generator 344) is coupled to another input of subtractor 36. The output of subtractor 36 is an indication of the difference between the magnitudes of change over the given time period of the comb filtered luminance $\angle Y$ and chrominance $\angle C$ phase angle signals. If this difference is zero, the two comb filtered phase angle signals changed by the same amount over the given time period, i.e. the phases tracked each other. Such a result indicates the presence of color representative information in the comb filtered luminance signal Y resulting in a hanging dot condition. The larger the difference, the less a hanging dot condition is indicated. The output of subtractor 36 is coupled to control signal generator 40 of FIG. 1.

Figure 4:
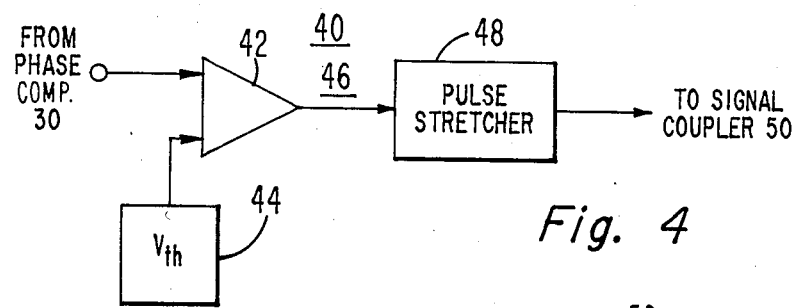
FIG. 4 is a block diagram of a control signal generator which may be used in the hanging dot detector illustrated in FIG. 1.

FIG. 4 illustrates a control signal generator 40 for use in the video signal processor of FIG. 1. The comparison signal from phase comparator 30 is applied to one input of comparator 42. A threshold level generator 44 is coupled to another input terminal of comparator 42. Comparator 42 and threshold level source 44 in combination form a threshold detector 46. The output of the threshold detector 46 is supplied to a pulse stretcher 48. The output of pulse stretcher 48 is coupled to signal coupling unit 50 of FIG. 1.

If the level of the phase change comparison is less than the threshold level supplied by threshold level generator 44, comparator 42 causes pulse stretcher 48 to generate the control signal, indicating a hanging dot condition. As discussed above, the nearer the comparison signal to zero, the more likely that a hanging dot condition exists. The threshold level can, thus, be adjusted for optimum performance.

Pulse stretcher 48 expands the time period of the control signal so that it is of sufficient width to be present during transitions before and after the detected hanging dot condition. An example of such a pulse stretcher is described in U.S. Pat. No. 4,001,496 entitled "Defect Detection and Compensation Apparatus for Use in an FM Signal Translating System" issued Jan. 4, 1977 to Clemens et al. See particularly the switch control signal generator 40 illustrated in FIG. 1 and described in the associated test of this patent. Signal coupler 50 of FIG. 1 has circuitry which operates in conjunction with pulse stretcher 48 to properly align the stretched pulse with the comb filtered luminance signal.

Figure 5:
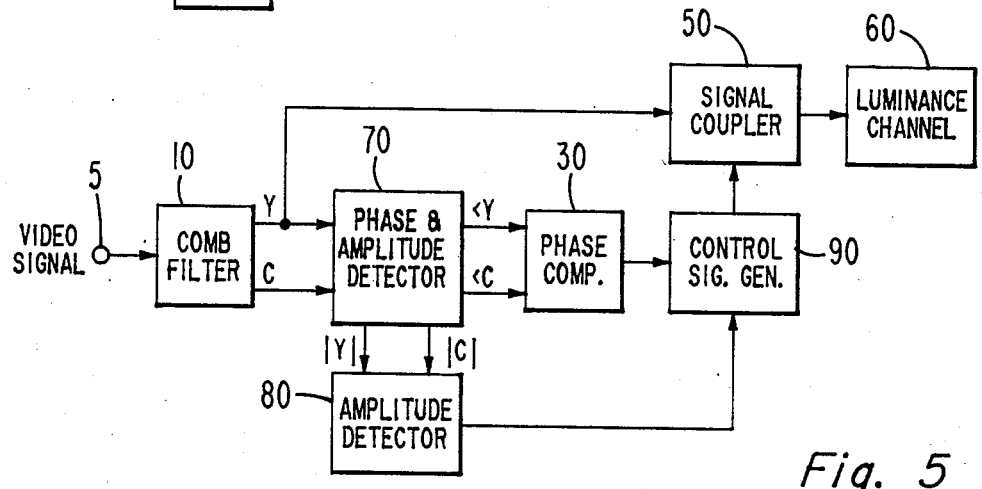
FIG. 5 is a block diagram of a video signal processor embodying a hanging dot detector according to another aspect of the present invention.

FIG. 5 illustrates a video signal processor embodying another aspect of the hanging dot detector. Those elements of FIG. 5 which are similar to those of FIG. 1, are indicated by the same reference numbers and operate in the same manner. Such elements will not be discussed in detail below.

The hanging dot detector illustrated in FIG. 5 will generate a control signal in a similar manner as that in FIG. 1, but only if the amplitudes of the portions of the color representative information in the comb filtered luminance and chrominance signal are both substantially non-zero. As discussed above, if the magnitude $|Y|$, $|C|$, of the color representative information in either the comb filtered luminance or chrominance are too small, then the detected phase angles $\angle Y$ or $\angle C$ have a lower accuracy. In addition, if the magnitudes are small, the deleterious effect is not large enough to be objectionable. Thus, the correction circuitry need not be activated, possibly erroneously, in such a situation.

In FIG. 5, the comb filtered luminance Y and chrominance C signals from comb filter 10 are applied to a phase and amplitude detector 70. The luminance $\angle Y$ and chrominance $\angle C$ phase angle signals are coupled to the phase comparator 30. The luminance $|Y|$ and chrominance $|C|$ amplitude signals are coupled to a non-zero amplitude detector 80. Non-zero amplitude detector 80 produces a signal indicating that the comb filtered luminance $|Y|$ and chrominance $|C|$ amplitude signals are both substantially non-zero.

The outputs of the phase comparator 30 and the non-zero amplitude detector 80 are coupled to the control signal generator 90. Control signal generator 90 generates a control signal in response to non-zero amplitudes detected by non-zero amplitude detector 80 and the output of phase comparator 30.

The signal from control signal generator 90 is supplied as a control signal to signal coupling unit 50 which, in response to the control signal, eliminates a color representative information from the comb filtered luminance signal Y before it is supplied to the luminance processing channel 60.

Referring again to FIG. 2, the portion of the figure illustrated in phantom provides a signal representing the magnitude $|Y|$ of color representative information in the comb filtered luminance signal Y. The orthogonal color difference signals I and Q are supplied to magnitude calculator 72. The above-mentioned U.S. Pat. No. 4,523,221 issued to Chin et al. describes an exemplary magnitude calculator which may be used as the magnitude calculator 72 in FIG. 2. As described above, a similar circuit is coupled to process the comb filtered chrominance signal C and produce the comb filtered chrominance amplitude $|C|$ signal.

Figure 6:
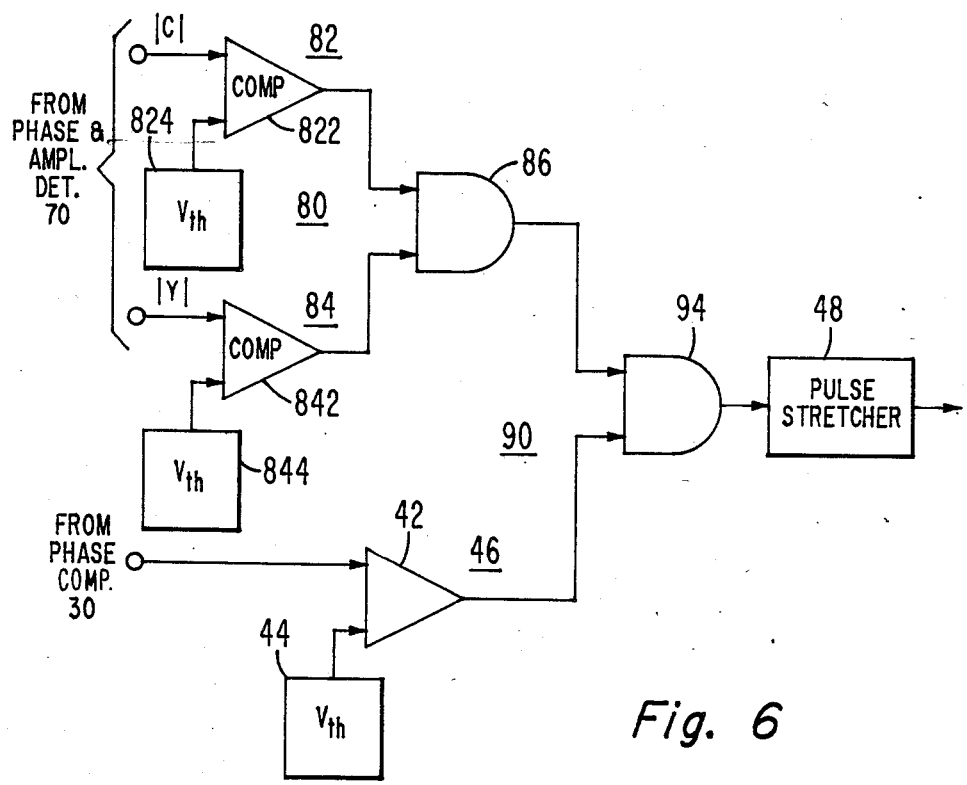
FIG. 6 is a diagram partially in block form and partially in logic schematic form of a control signal generator which may be used in the hanging dot detector illustrated in FIG. 5.

FIG. 6 illustrates a non-zero amplitude detector 80 and control signal generator 90 for use in the video signal processor illustrated in FIG. 5. Elements similar to those in the control signal generator 40 of FIG. 1 have the same reference numbers and operate in the same manner.

The comb filtered chrominance amplitude signal $|C|$ from phase and amplitude detector 70 is coupled to one input of a comparator 822. A threshold level supply 824 is coupled to another input of comparator 822. Comparator 822 and threshold level source 824 in combination form a threshold detector 82.

The comb filtered luminance amplitude signal $|Y|$ from phase and amplitude detector 70 is coupled to one input of comparator 842. A threshold level source 844 is coupled to another input of comparator 842. Comparator 842 and threshold level source 844 in combination form a threshold detector 84.

The outputs of threshold detectors 82 and 84 are coupled to respective input terminals of AND gate 86. The output of AND gate 86 is the output of non-zero amplitude detector 80.

The outputs of threshold detectors 82 and 84 are '1' only if the level of the comb filtered chrominance |C| and luminance |Y| amplitude signals respectively are greater than the level supplied by threshold level sources 824 and 844 respectively. The outputs are '0' otherwise. The output of AND gate 86, thus, is a '1' only if the comb filtered luminance |Y| and chrominance |C| amplitude signal levels are both greater than their respective threshold levels. As discussed above, in this situation, the phase angles detected will be more accurate and the hanging dots will be more noticeable.

The output of threshold detector 46, which operates in the manner described above in reference to FIG. 4, is coupled to one input of an AND gate 94. The output of non-zero amplitude detector 80 (from AND gate 86) is coupled to another input of AND gate 94. The output of AND gate 94 is coupled to a pulse stretcher 48. Threshold detector 46, AND gate 94 and pulse stretcher 48 in combination form control signal generator 90.

If the phase are tracking each other, the output of threshold detector 46 is a '1'. If the amplitudes are at a high enough level (indicated by a '1'from AND gate 86) and the phases are tracking (indicated by a '1' from threshold detector 46), the output of AND gate 94 is '1'. If the output of AND gate 94 is '1', this indicates a hanging dot situation. The frequency composition of the comb filtered luminance signal is altered in that case to eliminate the color representative information, as discussed above. When the output of AND gate 94 is '1', pulse stretcher 48 produces a stretched pulse for the reasons discussed above in the description of FIG. 4. The output of signal stretcher 48 is supplied to the signal coupling unit 50 of FIG. 5.

Figure 7:
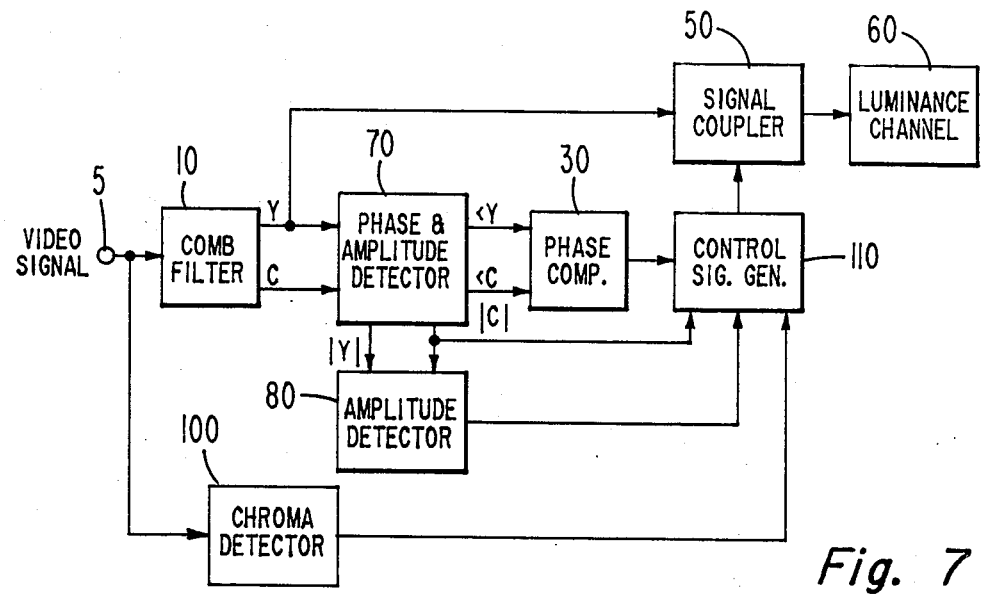
FIG. 7 is a block diagram of a video signal processor embodying a hanging dot detector according to yet another aspect of the present invention.

FIG. 7 illustrates a video signal processor embodying a hanging dot detector according to yet another aspect of the present invention. Those elements of FIG. 7 which are similar to those of FIGS. 1 and 5 are indicated by the same reference numbers and operate in the same manner.

In FIG. 7, the control signal generator 110 receives signals from phase angle comparator 30 and non-zero amplitude detector 80, as in FIG. 5. In addition, control signal generator 110 receives signals from the chrominance amplitude |C| output of the phase and amplitude detector 70 and a chrominance detector 100.

Chrominance detector 100 receives at its input the composite video signal from terminal 5 and produces at its output a signal indicating the presence of signals in the frequency band normally occupied by color representative information. Chrominance detector 100 could, for example, include a bandpass filter for passing only the frequencies normally containing color representative information; an envelope detector coupled to the output of the bandpass filter and the threshold detector coupled to the output of the envelope detector.

If the level of the signal detected by the envelope detector exceeds the threshold level in the threshold detector, then the output of the threshold detector is '1' and is '0' otherwise. The output of the threshold detector is the output of the chrominance detector 100.

Control signal generator 110 generates a control signal in response to non-zero comb filtered luminance |Y| and chrominance |C| amplitude signals and tracking of the comb filtered chrominance ∠C and luminance ∠Y phase angle signals, as in FIG. 5. In addition, the control signal generator 110 generates a control signal if the comb filtered chrominance amplitude signal |C| is substantially zero but the level of the signal in the band of frequencies normally occupied by the color representative information in the composite video signal is non-zero. The latter set of conditions indicates a complementary-color vertical transition. In either of these cases, color representative information in the comb filtered luminance signal is eliminated by the signal coupling unit 50.

Figure 8:
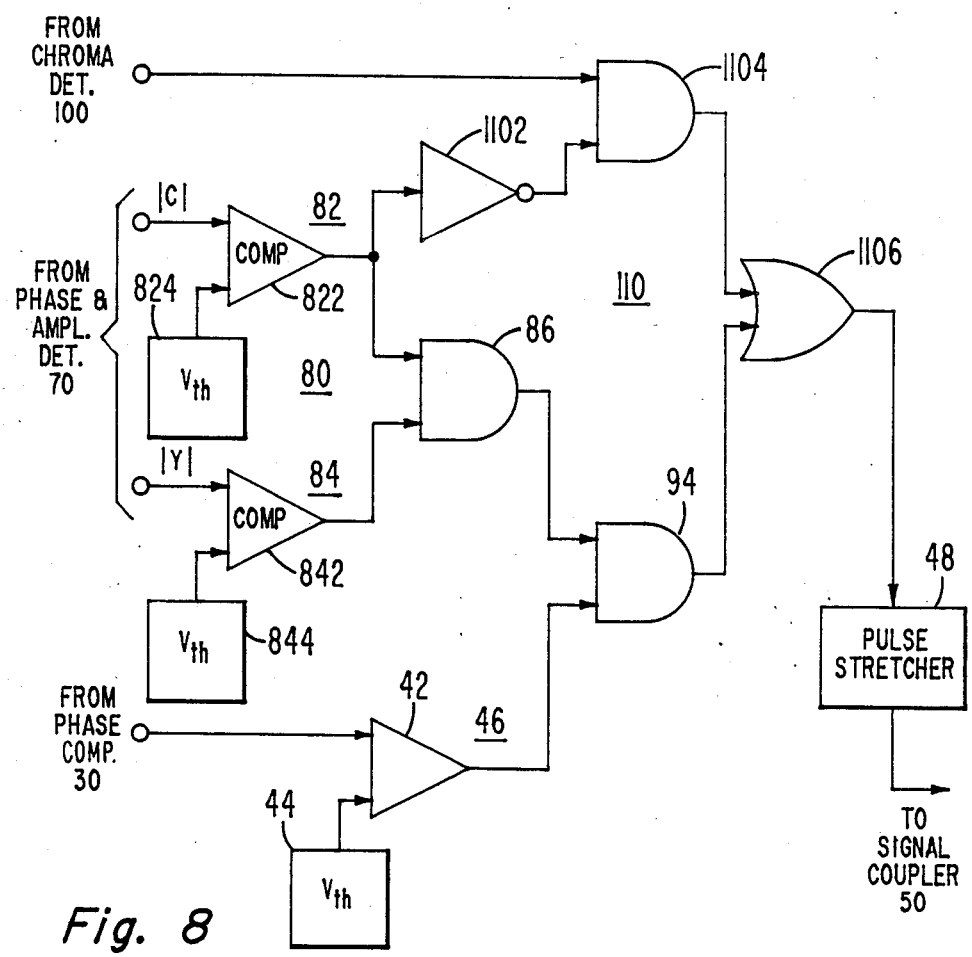
FIG. 8 is a diagram partially in block form and partially in logic schematic form of a control signal generator which may be used in the hanging dot detector illustrated in FIG. 7.

FIG. 8 illustrates a non-zero amplitude detector 80 and control signal generator 110 which may be used in the video signal processor of FIG. 7. Elements in FIG. 8 which are similar to those of FIGS. 4 and 6 have the same reference numbers and operate in the same manner.

As in FIG. 6, the output of AND gate 94 is a '1' if the comb filtered luminance |Y| and chrominance |C| amplitude signals are both greater than respective given thresholds and the comb filtered chrominance ∠C and luminance ∠Y phase signals are tracking. The output of AND gate 94 is coupled to one input of an OR gate 1106.

The signal indicating a non-zero amplitude of color representative information in the composite video signal from chrominance detector 100 is coupled to one input of an AND gate 1104. An inverter 1102 is coupled to the output of threshold detector 82. The output of inverter 1102 is coupled to another input of AND gate 1104. The output of AND gate 1104 is coupled to another input of OR gate 1106. The output of OR gate 1106 is coupled to signal stretcher 48. The output of signal stretcher 48 is the control signal supplied to signal coupling unit 50.

The output of inverter 1102 is a '1' only if the comb filtered chrominance amplitude signal |C| is less than a given threshold, as indicated by a '0' output from threshold detector 82. The output of chrominance detector 100 is a '1' when the signals in the frequency band normally containing color representative information in the composite video signal is substantially non-zero. The output of AND gate 1104 will, therefore, be a '1' in a complementary-color vertical transition condition. The output of OR gate 1106 is a '1' in either a complementary-color vertical transition condition, or in the non-zero amplitude and phase tracking condition and causes signal stretcher 48 to generate a stretched control signal. Such a detector will properly detect both types of hanging dot situations and the signal coupling unit 50 will properly condition the comb filtered luminance signal Y under those conditions.

It should be understood that, although the embodiments illustrated utilized digital circuitry, the invention may be embodied in either continuous or sampled data signal processors. Sampled data signal processors embodying the invention may be either analog or digital implementations.

What is claimed is:

1. In a video signal processor including: a comb filter for producing comb filtered luminance and chrominance signals, a luminance processing channel, and means for coupling said comb filtered luminance signal to said luminance processing channel including means for altering the frequency composition of said comb filtered luminance signal in response to a control signal; a magnitude independent hanging dot detector comprising:

phase detecting means coupled to said comb filter for generating a first signal representing the phase angle of said comb filtered luminance signal and a second signal representing the phase angle of said comb filtered chrominance signal;

means for determining the change over a predetermined time period of said first signal and the change over said predetermined time period of said second signal;

means for comparing the change over said predetermined time period of said first signal to the change over said predetermined time period of said second signal; and means coupled to said comparing means for generating said control signal in response to said comparison.

2. The hanging dot detector of claim 1, wherein said phase detecting means comprises:

a first demodulator responsive to said comb filtered chrominance signal for extracting a first pair of base color signals;

first means for producing said first signal representing the phase angle between a predetermined axis and the resultant of said first pair of base color signals;

a second demodulator responsive to said comb filtered luminance signal for extracting a second pair of base color signals; and second means for producing said second signal representing the phase angle between said predetermined axis and the resultant of said second pair of base color signals.

3. The hanging dot detector of claim 2 wherein for each of said pairs of base color signals, the value of one of said pair of base color signals represents the magnitude of one of a pair of basis vectors which are orthogonal, and the other one of said pair of base color signals represents the magnitude of the other one of said pair of basis vectors.

4. The hanging dot detector of claim 2 wherein for each of said pairs of base color signals, the value of one of said pair of base color signals represents the magnitude of one of a pair of basis vectors which form a 120° angle, and the other one of said pair of base color signals represents the magnitude of the other one of said pair of basis vectors.

5. The hanging dot detector of claim 1, wherein said comparing means comprises:

a subtractor coupled to said change determining means.

6. The hanging dot detector of claim 5, wherein said change determining means comprises:

a first delay circuit having an input terminal responsive to said first signal and an output terminal producing a signal delayed by said predetermined time period with respect to the signal at said input terminal;

a first subtractor having a first input terminal coupled to said input terminal of said first delay circuit a second input terminal coupled to said output terminal of said first delay circuit and an output terminal producing a signal representing the change over said predetermined time period of said first signal;

a second delay circuit having an input terminal responsive to said second signal and an output terminal producing a signal delayed by said predetermined time period with respect to the signal at said input terminal; and a second subtractor having a first input terminal coupled to said input terminal of said second delay circuit, a second input terminal coupled to said output terminal of said second delay circuit and an output terminal producing a signal representing the change over said predetermined time period of said second signal.

7. The hanging dot detector of claim 1, wherein said control signal generating means comprises:

a threshold detector having an input terminal coupled to said comparing means for producing an output signal having a first state when the value of the signal at said input terminal is less than a given threshold, and a second state otherwise; and a pulse stretcher, having an input terminal coupled to said threshold detector, for producing said control signal of longer time duration than that of said output signal of said threshold detector.

8. In a video signal processor including: a comb filter responsive to a composite video signal including a band of frequencies normally occupied by color representative information for producing comb filtered luminance and chrominance signals, a luminance processing channel, and means for coupling said comb filtered luminance signal to said luminance processing channel including means for altering the frequency composition of said comb filtered luminance signal in response to a control signal; a magnitude independent hanging dot detector comprising:

phase and amplitude detecting means coupled to said comb filter for generating a first signal representing the phase angle and a second signal representing the amplitude of the portion of said comb filtered luminance signal in said band of frequencies, and generating a third signal representing the phase angle and a fourth signal representing the amplitude of the portion of said comb filtered chrominance signal in said band of frequencies;

means for detecting concurrently non-zero amplitudes of said second and fourth signals;

means for determining the change over a predetermined time period of said first signal and the change over said predetermined time period of said third signal;

means for comparing the change over said predetermined time period of said first signal to the change over said predetermined time period of said third signal; and means coupled to said comparing means and said non-zero detecting means for generating said control signal in response to said concurrently detected non-zero amplitudes and to said comparison.

9. The hanging dot detector of claim 8, wherein said phase and amplitude detecting means comprises:

a first bandpass filter responsive to said comb filtered luminance signal for passing said band of frequencies;

a first demodulator coupled to said first bandpass filter for extracting a first pair of base color signals;

first means responsive to said first pair of base color signals for producing said first signal representing the phase angle between the resultant of said first pair of base color signals and a predetermined axis, and producing said second signal representing the magnitude of the resultant of said first pair of base color signals;

a second bandpass filter responsive to said comb filtered chrominance signal for passing said band of frequencies;

a second demodulator coupled to said second bandpass filter for extracting a second pair of base signals; and second means responsive to said second pair of base color signals for producing said third signal representing the phase angle between the resultant of said second pair of base color signals and said predetermined axis, and producing said fourth signal representing the magnitude of the resultant of said second pair of base color signals.

10. The hanging dot detector of claim 8, wherein said non-zero detecting means comprises:

a first threshold detector responsive to said second signal, and producing a first output signal having a first state when said second signal is substantially non-zero, and a second state otherwise;

a second threshold detector responsive to said fourth signal and producing a second output signal having said first state when said fourth signal is substantially non-zero, and said second state otherwise; and an AND gate having respective input terminals responsive to said first and second output signals.

11. The hanging dot detector of claim 8, wherein said control signal generator comprises:

a threshold detector, having an input terminal coupled to said comparing means, for generating a signal having a first state when the signal at said input terminal is less than a given threshold, and a second state otherwise;

an AND gate having a first input terminal coupled to said non-zero detecting means, a second input terminal coupled to said threshold detector, and an output terminal; and a pulse stretcher coupled to said output terminal of said AND gate for producing said control signal of longer time duration than that of the signal at said output terminal of said AND gate.

12. In a video signal processor including: a source of composite video signals including a band of frequencies normally occupied by color representative information, a comb filter coupled to said source for producing comb filtered luminance and chrominance signals, a luminance processing channel, and means for coupling said comb filtered luminance signal to said luminance processing channel including means for altering the frequency composition of said comb filtered luminance signal in response to a control signal; a magnitude independent hanging dot detector comprising:

phase and amplitude detecting means coupled to said comb filter for generating a first signal representing the phase angle and a second signal representing the amplitude of the portion of said comb filtered luminance signal in said band of frequencies, and generating a third signal representing the phase angle and a fourth signal representing the amplitude of the portion of said comb filtered chrominance signal in said band of frequencies;

first means for detecting a non-zero amplitude of said second signal;

second means for detecting a non-zero amplitude of said fourth signal;

means for determining the change over a predetermined time period of said first signal and the change over said predetermined time period of said third signal;

means for comparing the change over said predetermined time period of said first signal to the change over said predetermined time period of said third signal;

third means for detecting a non-zero amplitude of the portion of said composite video signal in said band of frequencies; and means coupled to said comb filter, said comparing means, and said first, second and third non-zero amplitude detecting means, for generating said control signal in response to either: concurrently detected non-zero amplitudes of said second and fourth signals and to said comparison; or concurrently detected non-zero amplitude composite video signal amplitude and a substantially zero amplitude of said fourth signal.

13. The hanging dot detector of claim 12, wherein said control signal generator comprises:

a threshold detector having an input terminal coupled to said comparing means for generating a signal having a first state when the signal at said input terminal is less than a given threshold, and a second state otherwise;

a first AND gate having a first input terminal coupled to said first non-zero amplitude detect or, a second input terminal coupled to said second non-zero amplitude detector and an output terminal;

a second AND gate having a first input terminal coupled to the output of said first AND gate, a second input terminal coupled to said threshold detector, and an output terminal;

an inverter having an input terminal responsive to to said fourth signal, and an output terminal;

a third AND gate having a first input terminal coupled to said output terminal of said inverter, a second input terminal coupled to said third non-zero amplitude detector, and an output terminal;

an OR gate having respective input terminals coupled to said output terminals of said first and second AND gates, and an output terminal; and a pulse stretcher coupled to said output terminal of said OR gate for producing said control signal of longer time duration than that of the signal at said output terminal of said OR gate.

* * * * *